(12) United States Patent
Popovich

(10) Patent No.: US 6,185,016 B1
(45) Date of Patent: Feb. 6, 2001

(54) SYSTEM FOR GENERATING AN IMAGE

(75) Inventor: Milan M. Popovich, Leicester (GB)

(73) Assignee: DigiLens, Inc., Sunnyvale, CA (US)

( * ) Notice: Under 35 U.S.C. 154(b), the term of this patent shall be extended for 0 days.

(21) Appl. No.: 09/484,494

(22) Filed: Jan. 18, 2000

Related U.S. Application Data

(60) Provisional application No. 60/119,421, filed on Jan. 19, 1999, and provisional application No. 60/116,420, filed on Feb. 9, 1999.

(51) Int. Cl.[7] .................................................. G02B 5/32
(52) U.S. Cl. ........................ 359/15; 359/13; 359/22; 359/24; 348/756; 348/795; 348/40; 349/6; 349/7; 349/201; 353/31
(58) Field of Search ................................ 359/13, 15, 22, 359/24, 204; 348/756, 795, 40, 41; 349/201, 6, 7; 353/31

(56) References Cited

U.S. PATENT DOCUMENTS

| | | | |
|---|---|---|---|
| 3,807,829 | 4/1974 | Close | 350/3.5 |
| 4,759,596 | 7/1988 | Po et al. | 350/96.15 |
| 4,830,441 | 5/1989 | Chang | 350/3.7 |
| 5,014,709 | 5/1991 | Bjelkhagen et al. | 128/654 |
| 5,093,563 | 3/1992 | Small et al. | 250/201.9 |
| 5,103,323 | 4/1992 | Magarinos et al. | 359/8 |
| 5,151,724 | 9/1992 | Kikinis | 357/17 |
| 5,153,670 | 10/1992 | Jannson et al. | 356/301 |
| 5,164,848 * | 11/1992 | Firth | 359/13 |
| 5,221,957 | 6/1993 | Jannson et al. | 356/301 |
| 5,227,898 | 7/1993 | Iavecchia et al. | 359/9 |
| 5,299,035 | 3/1994 | Leith et al. | 359/9 |
| 5,305,124 * | 4/1994 | Chern | 359/13 |
| 5,365,354 | 11/1994 | Jannson et al. | 359/15 |
| 5,418,631 | 5/1995 | Tedesco | 359/15 |
| 5,471,327 | 11/1995 | Tedesco et al. | 359/15 |
| 5,506,701 | 4/1996 | Ichikawa | 359/15 |
| 5,530,565 | 6/1996 | Owen | 359/15 |
| 5,535,024 | 7/1996 | Khoury et al. | 359/7 |
| 5,537,232 | 7/1996 | Biles | 359/15 |
| 5,539,544 | 7/1996 | Le Paih et al. | 359/15 |
| 5,557,283 | 9/1996 | Sheen et al. | 342/179 |
| 5,581,378 | 12/1996 | Kulick et al. | 359/9 |
| 5,608,552 | 3/1997 | Smith | 349/5 |
| 5,615,186 | 3/1997 | Rosen et al. | 369/44.24 |
| 5,629,784 | 5/1997 | Abileah et al. | 349/112 |
| 5,680,231 | 10/1997 | Grinberg et al. | 359/15 |
| 5,701,132 * | 12/1997 | Kollin | 345/8 |
| 5,703,702 | 12/1997 | Crane et al. | 359/1 |
| 5,721,598 | 2/1998 | Smith | 349/106 |
| 5,721,630 | 2/1998 | Horner et al. | 359/15 |
| 5,777,742 | 7/1998 | Marron | 356/359 |
| 5,796,498 | 8/1998 | French | 359/4 |
| 5,796,499 | 8/1998 | Wenyon | 359/15 |
| 5,808,759 | 9/1998 | Okamori et al. | 359/15 |
| 5,942,157 | 8/1999 | Sutherland et al. | 252/582 |
| 5,993,006 | 11/1999 | Takeuchi et al. | 353/30 |
| 6,040,928 * | 3/2000 | Popovich | 359/15 |

* cited by examiner

*Primary Examiner*—Cassandra Spyrou
*Assistant Examiner*—Leo Boutsikaris
(74) *Attorney, Agent, or Firm*—Ritter VanPelt & Yi LLP

(57) ABSTRACT

A system for generating an image comprising an illumination system having a light source and a plurality of holographic devices switchable between an active state wherein light from the light source is diffracted by the device and a passive state wherein the light is not diffracted by the device. A display device is positioned for illumination by the illumination system and operable to project a display image. The system further includes an optical projection device operable to receive the displayed image and form an intermediate image having a generally uniform illumination distribution on an optical diffuser. The diffuser is operable to project a resultant image with an emission angle larger than an emission angle of the display panel.

26 Claims, 4 Drawing Sheets

SYSTEM FOR GENERATING AN IMAGE

RELATED APPLICATIONS

The present application claims the benefit of U.S. Provisional Applications Ser. No. 60/116,421, filed Jan. 19, 1999 and Ser. No. 60/119,420, filed Feb. 9, 1999.

BACKGROUND OF THE INVENTION

The present invention relates generally to image generating devices, and more particularly, to compact display systems, such as those used in head mounted displays.

Head mounted displays have received considerable attention as a technique for displaying high magnification, large field of view, and high definition virtual images. The head mounted display generally includes a support member for mounting the display on a head of a user and various optical and display components. The components are arranged to magnify an image displayed on a compact image display panel (microdisplay) such as a liquid crystal display (LCD) and to display the magnified image ahead of the user through the optical system. The user typically does not directly observe an image displayed on a monitor or screen, but instead observes a magnified virtual image converted from the image displayed on the display panel. The head mounted display thus provides a compact arrangement for displaying to the user a larger image than displayed on a small microdisplay panel.

Recently, microdisplay devices have been developed that produce a viewable image generally no greater than 4.8 mm×3.6 mm in size. This is advantageous in terms of reducing manufacturing cost, however, problems have been encountered in attempting to magnify these small images for comfortable viewing by a user. Typically, such displays have an emission angle of approximately 10 to 15 degrees. For example, if the microdisplay device is based on liquid crystal technology, there is only a narrow angle over which a high contrast image is viewable. An optical system used to magnify the image displayed on the microdisplay must provide a sufficiently large exit pupil. The exit pupil needs to be large enough to allow for rotations and side to side movement of the eye and slippage of the display. Exit pupil size usually has to be traded off against field of view. However, due to the Lagranage invariant of classical optical theory, the size of the exit pupil and field of view must be constrained as follows:

Exit Pupil Dimension×Field of View=Display Dimension×Emission Angle.

Since both the display dimension and the emission angle are small, the viewing geometry is typically limited to an exit pupil of 6 mm diameter and a field of view of 40°. If larger fields of view are required, the exit pupil may be too small to be usable for comfortable viewing of the image.

Furthermore, it is often difficult to provide a sufficiently bright image with a microdisplay. In order to produce a multicolor image with a microdisplay that produces only monochrome images, a sequence of images are typically displayed and illuminated sequentially with red, green, and blue lights produced by a light source (e.g., array of light emitting diodes (LEDs)). The projected emission area of the light source on the surface of the microdisplay must generally conform to the size of the microdisplay. This typically results in a displayed image that is insufficiently bright.

There is, therefore, a need for an image generating device for use with a microdisplay, which provides a relatively large field of view and exit pupil and a sufficiently bright image that can be comfortably viewed by a user with a compact wearable display.

SUMMARY OF THE INVENTION

A system for generating an image is disclosed. The system includes an illumination system comprising a light source and a plurality of holographic devices switchable between an active state wherein light from the light source is diffracted by the device and a passive state wherein the light is not diffracted by the device. A display panel is positioned for illumination by the illumination system and operable to project a display image. The system further includes an optical projection system operable to receive the display image and form an intermediate image having a generally uniform illumination distribution and an optical diffuser positioned such that the intermediate image is formed thereon and configured to project a resultant image with an emission angle larger than an emission angle of the display panel.

The light source preferably comprises an array of red, green, and blue light emitting diodes (LED). The plurality of holographic devices may comprise three holographic optical elements each having a hologram recorded therein which is optimized to diffract red, green, or blue light. The diffuser may also comprise three holographic optical elements each having a hologram optimized to diffract red, green, or blue light. The switchable holographic optical elements of the illumination system and diffuser are sequentially operated simultaneously to create a sequence of monochrome images, which are combined to form a multicolor resultant image.

In another aspect of the invention, an image generating system generally comprises an illumination system comprising a plurality of lasers and a scanner operable to receive laser beams from the lasers and scan the laser beams to produce an intermediate image on an optical diffuser. The diffuser is operable to project a resultant image having a viewable angular range greater than a viewable angular range of the intermediate image.

The image generating system may also include a reflective optical device positioned to transmit the resultant image from the optical diffuser to a user for viewing. The reflective device may also include switchable holographic devices.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
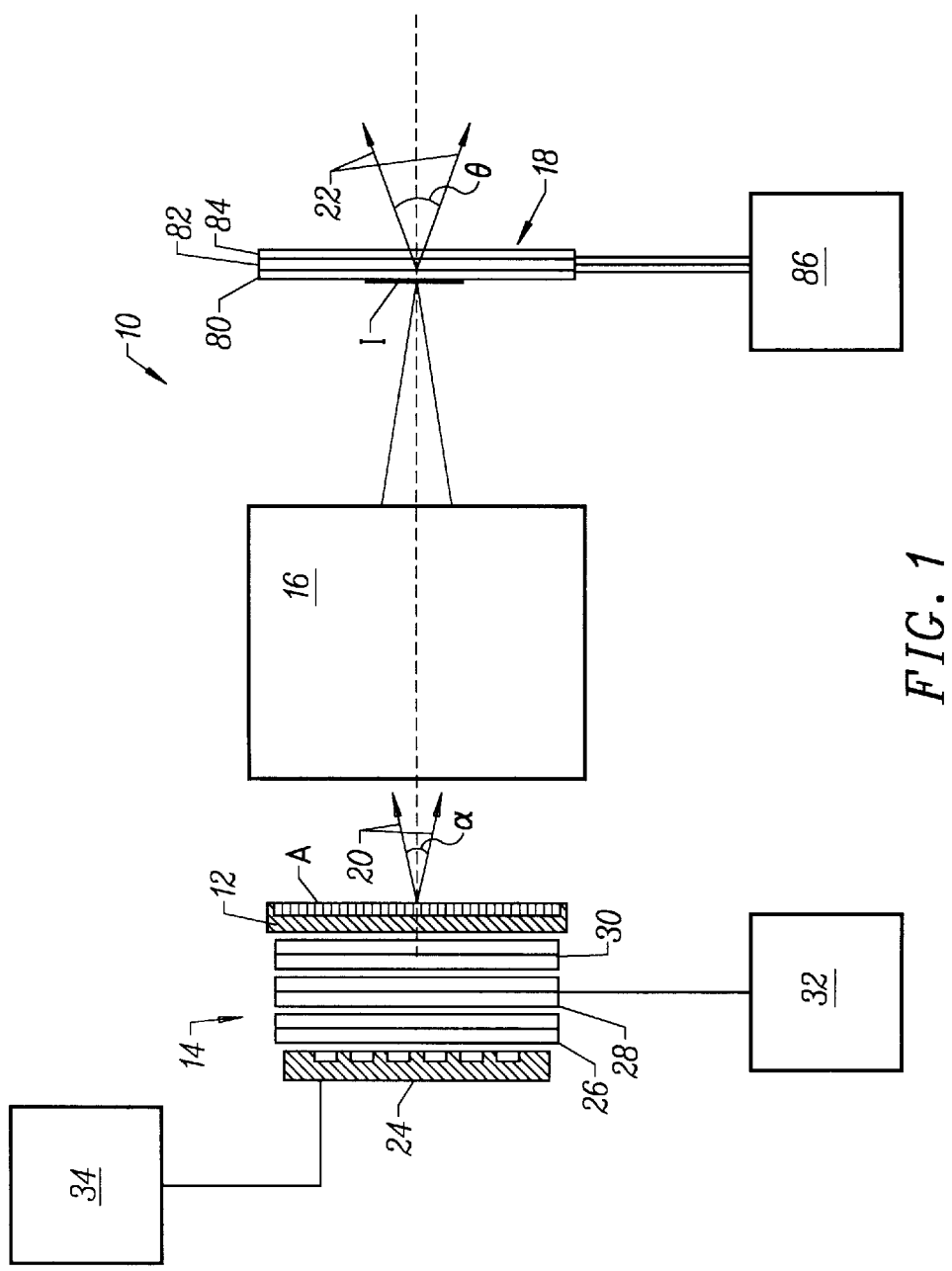
FIG. 1 is schematic of a first embodiment of an image generating system of the present invention utilizing an LED light source.

Referring now to the drawings, and first to FIG. 1, an image generating system, generally indicated at 10, is shown. The system 10 may be used in a head mounted display, hand held display or other compact display devices. The system 10 includes a display device 12 operable to produce an image, an illumination system, generally indicated at 14, operable to illuminate the display device, an optical projection system 16 positioned to receive the image displayed by the display device, and an optical diffuser 18. The projection system 16 is configured to form a real, focused intermediate image I having a generally uniform illumination distribution on the diffuser 18. The intermediate image is preferably magnified. The diffuser 18 is configured to project a resultant image for viewing by a user. The optical system 16 and diffuser 18 are utilized to overcome constraints imposed by the relatively small angular range (emission angle $\alpha$) over which small display devices 12 (such as a microdisplay device operable to produce a viewable image less than 5 mm×4 mm in size) are viewable (as indicated by arrows 20). The small emission angle $\alpha$ in combination with the small display area A of the microdisplay 12 imposes a significant constraint on the size of the exit pupil of the viewing system, as well as the field of view. The diffuser 18 increases the angular bandwidth of ray bundles originating at the intermediate image I plane, thereby increasing the angular range (emission angle $\theta$) over which the image is viewable (as indicated by arrows 22). This effectively increases the Lagrange Invariant of the overall system 10. The size and polar diagram of the resultant image after diffusion by the diffuser 18 are arranged so as to satisfy the Lagrange Invariant for the required field of view of the exit pupil. For example, the optical system 10 may form the resultant image with a one to one magnification of the image displayed by the display 12. In this case the product of the field of view and exit pupil can be increased by arranging the components so that the element 18 has a diffusion characteristic such that the resultant image has a larger emission angle than that of the light from the input image display. The resultant image may be used as a source image for further optics (shown in FIG. 5 and described below) which project the image to the user's eye or eyes.

The display 12 generates video or graphic information and may comprise a liquid crystal display (LCD) panel, or any other spatial light modulator (SLM) which reflects or transmits light produced externally. The display 12 may be a miniature reflective LCD having either a nematic or ferroelectric material on a silicon backplane, for example. The display 12 may also be based on transmissive display technologies. The display 12 is preferably configured to display a monochrome image on its display panel. As described below, the display 12 is color illuminated sequentially using separate red, green, and blue light sources so that images projected from the display appear to be displayed as a composite multicolor image.

A micro-electromechanical system, such as a Digital Light Processor (DLP) using a Digital Micromirror Device™ (DMD) available from Texas Instruments, may also be used as the display 12. The DMD is a micromechanical silicon chip having movable mirrors which reflect light to create high quality images. An image is formed on the reflective surface of the DMD by turning the mirrors on or off digitally at a high speed. An image is generated by color sequentially illuminating the display and turning individual mirrors on or off for durations which depend on the amount of each primary color required to generate the required color value at each pixel.

The display 12 may also be a diffractive display device such as a Grating Light Valve™ (GLV) available from Silicon Light Machines (formerly Echelle, Inc.). The GLV uses micro-electromechanical systems to vary how light is reflected from multiple ribbon structures which can move small distances to create a grating that selectively diffracts specified wavelengths of light. Picture elements (pixels) are formed on the surface of a silicon chip and become the image source for display projection. It is to be understood that display panels other than those described herein may be used without departing from the scope of the invention.

The illumination system 14 includes an array of light emitting diodes (LEDs) 24 arranged in red, green, and blue triads, or alternating rows of red, green, and blue, for example. The illumination system 14 further includes three switchable holographic devices (holographic optical elements 26, 28, 30) which each act upon red, green, or blue light. An illumination controller 32 switches each of the holographic optical elements 26, 28, 30 between an active state and a passive state in conjunction with an LED controller 34 which controls the LED array 24. The LED controller 34 energizes the red, green, and blue LEDs sequentially and in synchronization with the illumination controller 32 so that red, green, and blue light is projected in turn onto the display 12, thereby producing red, green, and blue images. The switching performed by the controllers 32, 34 is sufficiently fast so that the image is perceived by a user as being multi-colored. The holographic optical elements 26, 28, 30 concentrate light from the LED array 24 onto a relatively small display area A. The LED array 24 is preferably sufficiently large so that the display can be made adequately bright for easy viewing. For example, the LED array may include an array of 6×8 sources, each source comprising separate red, green, and blue LED die configured in a triad. The individual LED die are square with sides typically in the 0.2–0.4 mm range. The sources are preferably uniformly distributed over an area roughly identical to that of the display panel. Alternatively, the LED die may be configured as alternate red, green, and blue rows. The red LEDs may have a peak wavelength of 621 nanometers, a bandwidth (at 50% of peak intensity) of 25 nanometers and a peak intensity in the range of 1–5 milliwatts per steradian, for example. The green LEDs may have a peak wavelength of 525 nanometers, a bandwidth (at 50% of peak intensity) of 35 nanometers and a peak intensity in the range of 1–5 milliwatts per steradian, for example. The blue LEDs may have a peak wavelength of 470 nanometers, a bandwidth (at 50% of peak intensity) of 25 nanometers and a peak intensity in the range of 1–5 milliwatts per steradian, for example. Alternatively, the LEDs may be replaced with solid state laser devices. With more intense sources such as lasers, high brightness may be achieved with fewer emitters than would be required for LED illumination systems.

Figure 2:
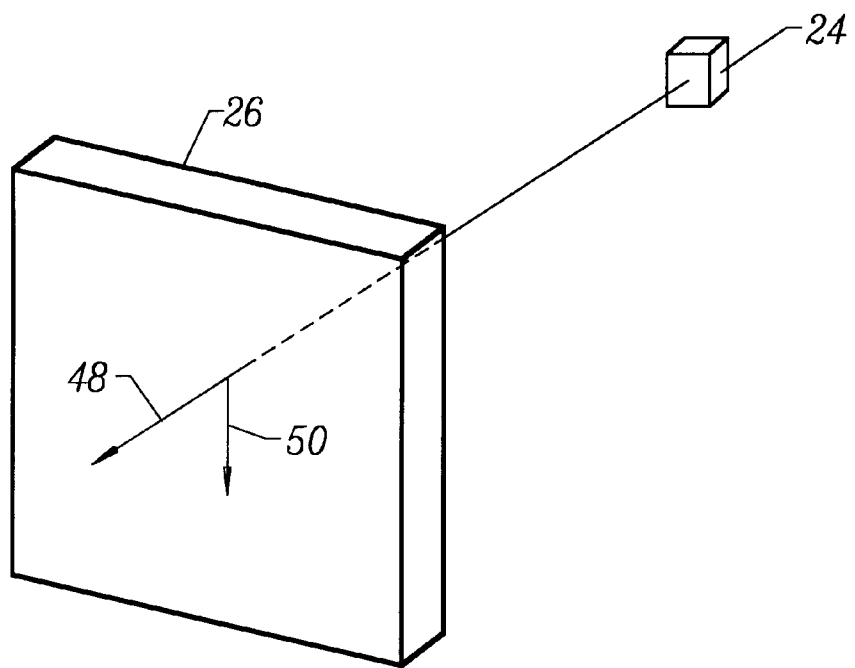
FIG. 2 is a perspective view of a holographic optical element and light source of the image generating system of FIG. 1.
Figure 3:
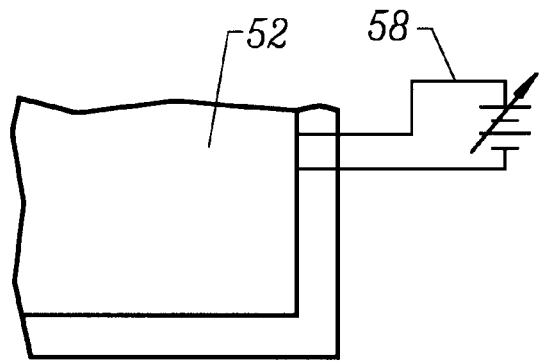
FIG. 3 is a partial front view of the holographic optical element of FIG. 2 illustrating an electrode and electric circuit of the holographic optical element.

The holographic optical elements 26, 28, 30 each include a hologram interposed between two electrodes 52 (FIGS. 2 and 3). The hologram may be a Bragg (thick or volume) hologram or Raman-Nath (thin) hologram. Raman-Nath holograms are thinner and require less voltage to switch light between various modes of the hologram, however, Raman-Nath holograms are not as efficient as Bragg holograms. The Bragg holograms provide high diffraction efficiencies for incident beams with wavelengths close to the theoretical wavelength satisfying the Bragg diffraction condition and within a few degrees of the theoretical angle which also satisfies the Bragg diffraction condition.

The hologram is used to control transmitted light beams based on the principles of diffraction. The hologram selectively directs an incoming light beam from the light source 24 either towards or away from a viewer and selectively diffracts light at certain wavelengths into different modes in response to a voltage applied to the electrodes 52. Light passing through the hologram in the same direction as the light is received from the light source 24 is referred to as the zeroth (0th) order mode 48 (FIG. 2). When no voltage is applied to the electrodes 52, liquid crystal droplets within the holographic optical element 26, 28, 30 are oriented such that the hologram is present in the element and light is diffracted from the zeroth order mode to a first (1st) order mode 50 of the hologram. When a voltage is applied to the holographic optical element 26, 28, 30, the liquid crystal droplets become realigned effectively erasing the hologram, and the incoming light passes through the holographic optical element in the zeroth order mode 48. It is to be understood that the holographic optical elements 26, 28, 30 may also be reflective rather than transmissive as shown in FIG. 2 and described above. In the case of a reflective holographic device, the arrangement of the holographic device and display 12 would be modified to utilize reflective properties of the hologram rather than the transmissive properties described herein.

The light that passes through the hologram is diffracted by interference fringes recorded in the hologram to form an image. Depending on the recording, the hologram is able to perform various optical functions which are associated with traditional optical elements, such as lenses and prisms, as well as more sophisticated optical operations. The hologram may be configured to perform operations such as deflection, focusing, or color filtering of the light, for example.

The holograms are preferably recorded on a photopolymer/liquid crystal composite material (emulsion) such as a holographic photopolymeric film which has been combined with liquid crystal, for example. The presence of the liquid crystal allows the hologram to exhibit optical characteristics which are dependent on an applied electrical field. The photopolymeric film may be composed of a polymerizable monomer having dipentaerythritol hydroxypentacrylate, as described in PCT Publication, Application Serial No. PCT/US97/12577, by Sutherland et al. The liquid crystal may be suffused into the pores of the photopolymeric film and may include a surfactant.

The diffractive properties of the holographic optical elements 26, 28, 30 depend primarily on the recorded holographic fringes in the photopolymeric film. The interference fringes may be created by applying beams of light to the photopolymeric film. Alternatively, the interference fringes may be artificially created by using highly accurate laser writing devices or other replication techniques, as is well known by those skilled in the art. The holographic fringes may be recorded in the photopolymeric film either prior to or after the photopolymeric film is combined with the liquid crystal. In the preferred embodiment, the photopolymeric material is combined with the liquid crystal prior to the recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the switchable holographic optical elements. Recording of the hologram may be accomplished by a traditional optical process in which interference fringes are created by applying beams of light. Alternatively, the interference fringes may be artificially created by using highly accurate laser writing devices or other optical replication techniques. As further described below, the optical properties of the holographic optical elements 26, 28, 30 primarily depend on the recorded holographic fringes in the photopolymeric film.

The electrodes (electrode layers) 52 are positioned on opposite sides of the emulsion and are preferably transparent so that they do not interfere with light passing through the hologram. The electrodes 52 may be formed from a vapor deposition of Indium Tin Oxide (ITO) which typically has a transmission efficiency of greater than 80%, or any other suitable substantially transparent conducting material. The electrodes 52 are connected to an electric circuit 58 operable to apply a voltage to the electrodes, to generate an electric field (FIG. 3). Initially, with no voltage applied to the electrodes 52, the hologram is in the diffractive (active) state and the holographic optical element 26, 28, 30 diffracts propagating light in a predefined manner. When an electrical field is generated in the hologram by applying a voltage to the electrodes 52 of the holographic optical element 26, 28, 30 the operating state of the hologram switches from the active state to the passive state and the holographic optical element does not optically alter the propagating light. It is to be understood that the electrodes may be different than described herein. For example, a plurality of smaller electrodes may be used rather than two large electrodes which substantially cover surfaces of the holograms.

Figure 4:
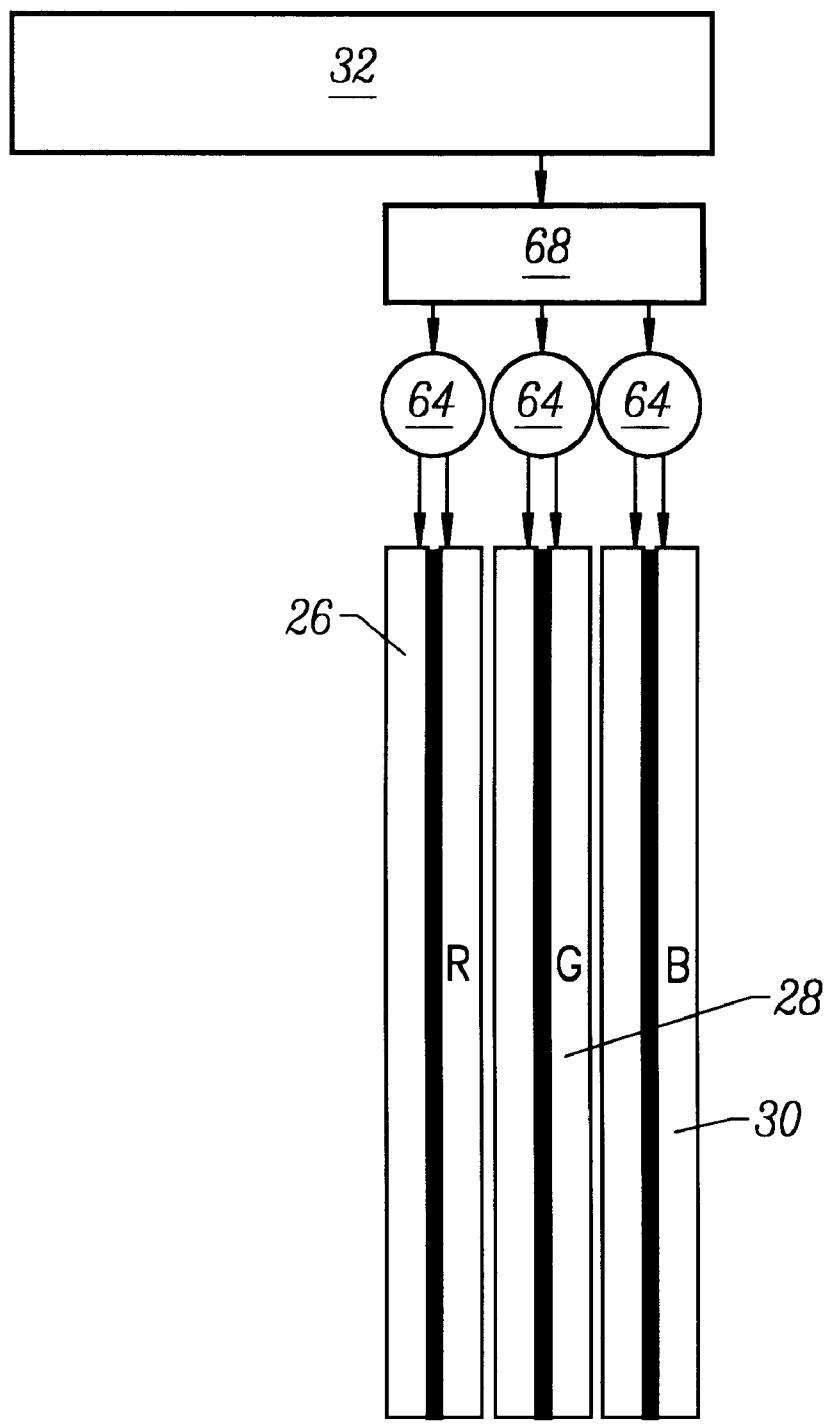
FIG. 4 is a schematic of three holographic optical elements each optimized to diffract red, green, or blue light, and an electronic controller operable to switch each of the holographic optical elements between an active state and a passive state.

Each holographic optical element 26, 28, 30 is holographically configured such that only a particular monochromatic light is diffracted by the hologram. The red optical element 26 has a hologram which is optimized to diffract red light, the green optical element 28 has a hologram which is optimized to diffract green light, and the blue optical element 30 has a hologram which is optimized to diffract blue light. The illumination controller 32 drives switching circuitry 64 associated with the electrodes 52 on each of the optical elements 26, 28, 30 to apply a voltage to the electrodes (FIGS. 3 and 4). The electrodes 52 are individually coupled to the device controller through a voltage controller 68 which selectively provides an excitation signal to the electrodes 52 of a selected holographic optical element 26, 28, 30, switching the hologram to the passive state. The voltage controller 68 also determines the specific voltage level to be applied to each electrode 52. A voltage may also be applied across the hologram such that the holographic optical element 26, 28, 30 is in a partially active state in which light passing through the hologram is partially affected by the optical characteristics of the hologram. This may be used, for example, to vary the light scattering characteristics of the holographic optical elements of the diffuser 18 described below.

Preferably, only one pair of electrodes 52 associated with one of the three holographic optical elements 26, 28, 30 is energized at one time. In order to display a color image, the controller 32 operates to sequentially display three monochromatic images of the color input image. The electrodes 52 attached to each of the holograms are sequentially enabled such that a selected amount of red, green, and blue light is directed towards the viewer. For example, when a red monochromatic image is projected, the controller 32 switches the green and blue holograms 28, 30 to the passive state by applying voltages to their respective electrodes 52. The supplied voltages to the electrodes 52 of the green and blue holograms 28, 30 create a potential difference between the electrodes, thereby generating an electrical field within the green and blue holograms. The presence of the electrical field switches the optical characteristics of the holograms 28, 30 to the passive state. With the green and blue holograms 28, 30 in the passive state and the red hologram 26 in the diffractive state, only the red hologram optically diffracts the projected red image. Thus, only the portion of the visible light spectrum corresponding to red light is diffracted to the viewer. The green hologram 28 is next changed to the diffractive state by deenergizing the corresponding electrodes 52 and the electrodes of the red hologram 26 are energized to change the red hologram to the passive state so that only green light is diffracted. The blue hologram 30 is then changed to the diffractive state by deenergizing its electrodes 52 and the electrodes of the green hologram 28 are energized to change the green hologram to its passive state so that only blue light is diffracted.

The holographic optical elements 26, 28, 30 and corresponding LEDs of the LED array 24 are sequentially enabled with a refresh rate (e.g., less than 150 microseconds) which is faster than the response time of a human eye so that a color image will be created in the viewer's eye due to the integration of the red, green, and blue monochrome images created from each of the red, green, and blue holograms. Consequently, the display 12 will be illuminated sequentially by red, green, and blue lights so that the final viewable image will appear to be displayed as a composite color. The red, green, and blue holographic elements 26, 28, 30 may be cycled on and off in any order.

The projection system 16 receives the image displayed by the display device 12 and forms the intermediate image I on the diffuser 18. Projection optics of the projection system 16 preferably focus and magnify the display images so that the images can be properly diffused by the diffuser 18. The optical system may be formed from conventional refractive optical elements, holographic diffractive elements (as described above for the illumination system 14), or a combination thereof. Cylindrical, prismatic, or off-axis aspheric optical components may also be included to correct for geometric aberrations in off-axis optical configurations such as those required to implement wearable displays, as is well known by those skilled in the art. The optical system 16 may also include reflective optical elements (not shown) to fold the optical path to further reduce the size of the image generating system 10.

The diffuser 18 preferably comprises a stack of switchable holographic optical elements 80, 82, 84 similar to the holographic optical elements 26, 28, 30 described above for the illumination system 14, except that the elements 80, 82, 84 have a diffusing function recorded therein. The diffusing function may be achieved by introducing diffusion elements (e.g., computer generated holograms) into one or more of the beams during recording of the hologram. Preferably, separate holographic diffusion elements are used for red, green, and blue wavelengths to prevent color distortion. The holograms for the different wavelength bands may also be recorded in a single holographic element, however, this may result in cross-talk between the different colors. The holographic optical elements 80, 82, 84 are controlled by a controller 86 which sequentially cycles the elements between their active and passive states in conjunction with the illumination elements 26, 28, 30. The diffuser 18 may also be passive (i.e., not switchable) and formed from a conventional diffusion screen or by a holographic diffraction element or holographic light shaping diffuser, for example.

Figure 6:
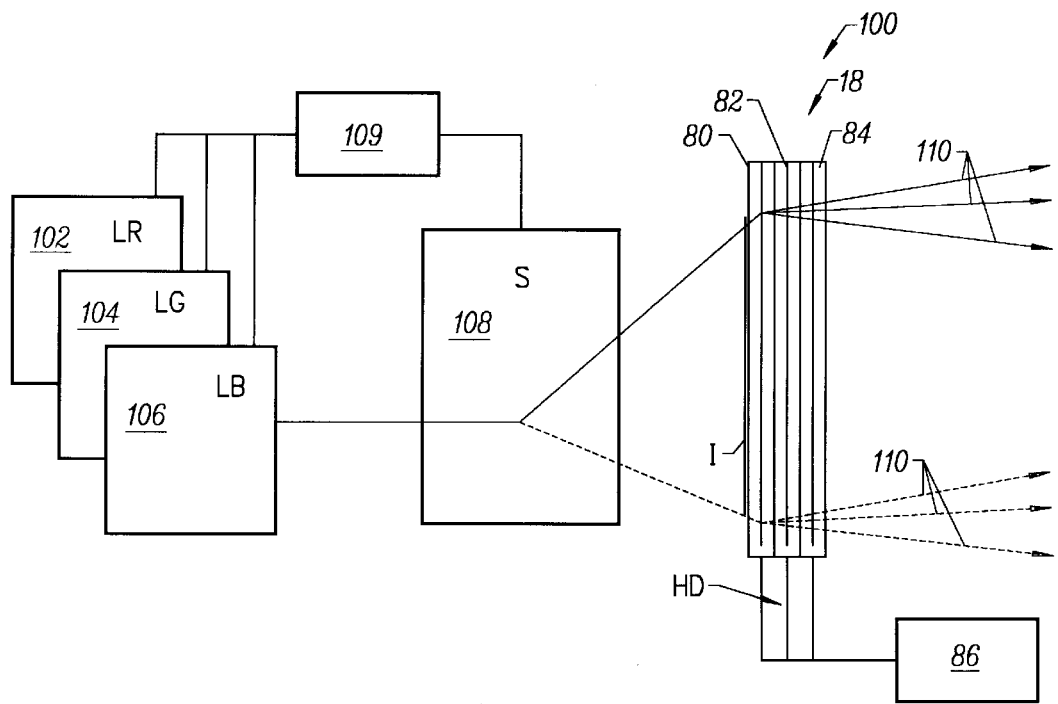
FIG. 6 is a schematic of the scanning laser light source and diffuser of the image generating device of FIG. 5.
Figure 5:
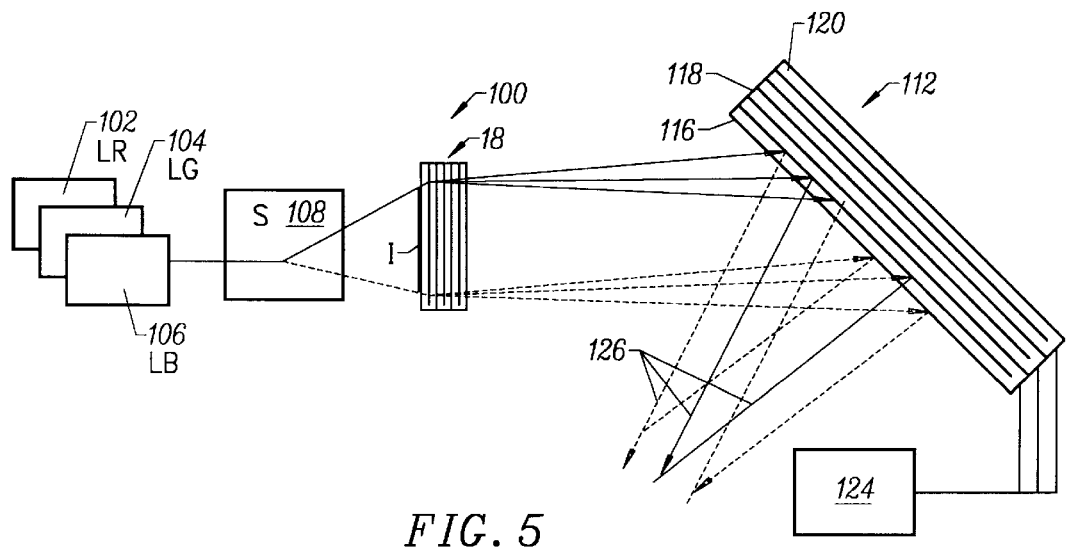
FIG. 5 is a schematic of a second embodiment of the image generating device of FIG. 1 utilizing a scanning laser light source.

FIGS. 5 and 6 illustrate a second embodiment of the image generating device, generally indicated at 100. The second embodiment 100 is similar to the first embodiment 10 except that the display 12 and illumination system 14 are replaced with a scanning laser having red, green, and blue lasers 102, 104, 106 and a beam scanner 108. A controller 109 is connected to the lasers 102, 104, 106 and scanner 108 to coordinate operation of the laser beams and scanner. The scanner 108 is operable to receive output beams from the lasers 102, 104, 106 and scan the beams onto the diffuser 18 to produce a scanned real intermediate image I on the diffuser. The scanner 108 may be based on acousto-optics, micromirrors, or piezoelectric technology, as is well known by those skilled in the art.

The diffuser 18 increases the angular bandwidth of ray bundles originating at the plane of the intermediate image I, thereby increasing the angular range over which the image I is viewable (as indicated by arrows 110). The Lagrange Invariant of the overall system 100 is thereby increased and the size and polar diagram of the resultant image after diffusion by the diffuser 18 are such as to satisfy the Lagrange Invariant for the required field of view of the exit pupil of the overall system 100.

After diffusion by the diffuser 18, light from the resultant image is transmitted to a reflective holographic diffusion device, generally indicated at 112, comprising a stack of switchable holographic optical elements 116, 118, 120 which are operable to diffract red, green, and blue wavelengths, respectively. The individual elements 116, 118, 120 may be switched between an active (diffracting) state and a passive (non-diffracting) state by a reflection controller 124. The holograms recorded in the elements 116, 118, 120 are operable to magnify and collimate the resultant image and transmit the image for viewing by a user (as indicated by arrows 126). The controllers 86, 124 are arranged to switch the holographic optical elements 80, 82, 84 of the diffuser 18 and the corresponding holographic elements 116, 118, 120 of the reflective device 112 generally simultaneously so that the red elements 80, 116 are activated in unison, the green elements 82, 118, and the blue elements 84, 118 are activated in unison.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. An image generating system comprising:
   an illumination system comprising a light source and a plurality of holographic devices switchable between an active state wherein light from the light source is diffracted by the device and a passive state wherein said light is not diffracted by the device;
   a display device positioned for illumination by the illumination system and operable to project a display image;
   an optical projection system operable to receive said display image and form an intermediate image having a generally uniform illumination distribution; and
   an optical diffuser positioned such that the intermediate image is formed thereon and operable to project a resultant image with an emission angle larger than an emission angle of the display device.

2. The image generating system of claim 1 wherein the light source comprises an array of light emitting diodes.

3. The image generating system of claim 2 wherein the array of light emitting diodes comprise red, green, and blue light emitting diodes.

4. The image generating system of claim 3 wherein the red, green, and blue diodes are arranged in a triad.

5. The image generating system of claim 1 wherein the switchable holographic device comprises a hologram interposed between two electrode layers operable to apply an electrical field to the hologram.

6. The image generating system of claim 5 wherein the hologram is formed from a polymer and liquid crystal material.

7. The image generating system of claim 1 wherein said plurality of holographic devices comprises three holographic optical elements.

8. The image generating system of claim 1 wherein the three holographic optical elements each have a hologram recorded therein which is optimized to diffract red, green, or blue light.

9. The image generating system of claim 8 wherein each hologram is interposed between two electrode layers operable to apply an electrical field to the hologram to diffract the red, green, or blue light.

10. The image generating system of claim 9 further comprising a controller operable to sequentially supply voltage to and remove voltage from the electrode layers of each holographic optical element to create a sequence of monochrome images which are combined to form a color image.

11. The image generating system of claim 10 wherein the light source comprises an array of red, green, and blue light emitting diodes and further comprising a light source controller operable to sequentially turn on and off the red, green, and blue light emitting diodes generally simultaneously with the red, green, and blue holographic optical elements, respectively.

12. The image generating system of claim 1 wherein the display device comprises a liquid crystal display.

13. The image generating system of claim 1 wherein the display device comprises a microdisplay device operable to produce a monochrome image.

14. The image generating system of claim 1 wherein the optical diffuser comprises a plurality of switchable holographic devices.

15. The image generating system of claim 14 wherein said plurality of switchable holographic devices comprises three holographic optical elements each having a hologram recorded therein which is optimized to diffract red, green, or blue light.

16. The image generating system of claim 15 wherein each hologram is interposed between two electrode layers operable to apply an electrical field to the hologram to diffract the red, green, or blue light.

17. The image generating system of claim 16 further comprising a diffuser controller operable to sequentially supply voltage to and remove voltage from the electrode layers of each holographic optical element to create a sequence of monochrome images which are combined to form a color resultant image.

18. The image generating system of claim 17 further comprising an illumination controller operable to switch the illumination system holographic devices generally simultaneously with the respective diffuser holographic optical elements.

19. An image generating system comprising:
   an illumination system comprising a plurality of lasers and a scanner operable to receive laser beams from the lasers and scan the laser beams to produce an intermediate image; and
   an optical diffuser positioned such that the intermediate image is formed thereon and operable to project a resultant image having a viewable angular range greater than a viewable angular range of the intermediate image, the optical diffuser comprising a plurality of switchable holographic devices.

20. The image generating system of claim 19 wherein said plurality of switchable holographic devices comprises three holographic optical elements each having a hologram recorded therein which is optimized to diffract red, green, or blue light.

21. The image generating system of claim 20 wherein each hologram is interposed between two electrode layers operable to apply an electrical field to the hologram to diffract the red, green, or blue light.

22. The image generating system of claim 21 further comprising a diffuser controller operable to sequentially supply voltage to and remove voltage from the electrode layers of each holographic optical element to create a sequence of monochrome images which are combined to form a multicolor resultant image.

23. The image generating system of claim 22 further comprising a reflective optical device positioned to transmit the resultant image from the optical diffuser to a user for viewing.

24. The image generating system of claim 23 wherein the reflective optical device comprises three holographic optical elements each having a hologram recorded therein which is optimized to diffract red, green, or blue light.

25. The image generating system of claim 24 further comprising a reflector controller operable to switch each of the red, green, and blue reflective holographic optical elements generally simultaneously with each of the red, green, and blue diffuser holographic optical elements, respectively.

26. The image generating system of claim 19 further comprising a reflective optical device positioned to transmit the resultant image from the optical diffuser to a user for viewing.

* * * * *